US011540110B2

(12) United States Patent
Khanduri (10) Patent No.: US 11,540,110 B2
(45) Date of Patent: Dec. 27, 2022

(54) SYSTEMS AND METHODS FOR SCALABLE REMOTE SIM PROVISIONING

(71) Applicant: Verizon Patent and Licensing Inc., Basking Ridge, NJ (US)

(72) Inventor: Prakash C. Khanduri, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 151 days.

(21) Appl. No.: 17/102,499

(22) Filed: Nov. 24, 2020

(65) Prior Publication Data

US 2022/0167146 A1 May 26, 2022

(51) Int. Cl.
*H04W 8/18* (2009.01)
*H04W 8/00* (2009.01)
*H04W 4/029* (2018.01)

(52) U.S. Cl.
CPC ........... *H04W 8/183* (2013.01); *H04W 4/029* (2018.02); *H04W 8/005* (2013.01)

(58) Field of Classification Search
CPC ...... H04W 8/183; H04W 8/005; H04W 4/029
USPC ...................................................... 455/418
See application file for complete search history.

(56) References Cited

U.S. PATENT DOCUMENTS

| 10,687,204 | B1* | 6/2020 | Roy ...................... H04W 8/205 |
| 2016/0183081 | A1* | 6/2016 | Flores Cuadrado .. H04M 15/50 |
| | | | 455/558 |
| 2016/0283216 | A1* | 9/2016 | Gao ..................... H04L 63/0428 |
| 2018/0014178 | A1* | 1/2018 | Baek ..................... H04W 8/183 |
| 2018/0176768 | A1* | 6/2018 | Baek ..................... H04W 8/183 |
| 2020/0059778 | A1* | 2/2020 | Li ......................... H04W 12/40 |
| 2020/0228969 | A1* | 7/2020 | Shin ..................... H04W 12/06 |

OTHER PUBLICATIONS

3GPP TS 23.122 V16.3.0 (Sep. 2019) (Year: 2019).*

* cited by examiner

*Primary Examiner* — William Nealon (57) ABSTRACT

A system, method, and computer-readable medium provide for determining that a user device does not include a subscriber identity module (SIM) profile activated to provision a wireless service of a first mobile network operator (MNO); obtaining location data for the user device; generating multiple mobile network codes (MNCs) and corresponding public land mobile network (PLMN) identifiers (IDs) for multiple MNOs that service an area associated with the location data, wherein the multiple MNOs include the first MNO; configuring, using the PLMN IDs, a radio frequency (RF) channel associated with each of the MNOs using each PLMN ID; generating temporary device IDs for the user device; transmitting a discovery message including each device ID via the RF channel associated with each MNO; receiving from the first MNO storing a reserved SIM profile for the device ID, a network address; and downloading the reserved SIM profile via the network address.

20 Claims, 5 Drawing Sheets

SYSTEMS AND METHODS FOR SCALABLE REMOTE SIM PROVISIONING

BACKGROUND INFORMATION

Mobile devices with embedded subscriber identity modules (eSIMs) may be a practical alternative to traditional SIMs (i.e., removable SIM cards) containing subscription credentials. While providing a comparable level of security and many design advantages over the removable SIM (e.g., being usable in a companion class of devices, such as wearables, etc.), eSIM technology presents a user experience distinct to that of using a SIM card with respect to activating user equipment (UE) for use on a mobile network operator (MNO) network. For example, UE activation may include using eSIM protocols.

DETAILED DESCRIPTION

The following detailed description refers to the accompanying drawings. The same reference numbers in different drawings may identify the same or similar elements. Also, the following detailed description does not limit the invention.

The eSIM solution offers MNOs, UE distributors, UE manufacturers, and UE users, benefits not afforded by traditional SIM technology (i.e., physical SIM cards). For example, eSIM-enabled devices—without the SIM card slot—provides a more compact design and is available to additional classes of UE (e.g., wearables). In addition, UE supply chain processes may be optimized, and the need for customization of UEs for specific MNOs and/or operating regions eliminated. Furthermore, eSIM technology may provide for simplified subscription management, for example, when activating UE devices or changing MNOs.

One challenge specific to SIM technology involves initial cellular service activation without an active SIM profile. For example, a user typically needs to activate a UE device obtained from an MNO, distributor, or retailer, and may need to remotely activate the UE device to enable service on the MNO's cellular network. In order to activate the UE device, the MNO may provision a network service using a designated SIM profile, which is downloaded to the UE device from a remote SIM provisioning (RSP) platform. Provisioning may involve installation of a service provider application on the UE device by using an activation voucher/code (e.g., a quick response (QR) code contained in printed material, a display at a point of sale, an email, etc.) that contains the address (e.g., a fully qualified domain name (FQDN) address) of the MNO's remote SIM provisioning system. Alternatively, activation may involve preloading of an MNO-specific application or an MNO-specific entitlement server address on the UE by the UE manufacturer. Currently, a high degree of user interaction is required and little to no scalability is possible in the initial connectivity process associated with bulk activation.

Systems and methods described herein may provide for SIM provisioning of UE devices requiring little to no user interaction, permit automation, and apply to UE devices that are not SIM-enabled. In some implementations, SIM provisioning operations may execute in the background while a user/administrator configures the UE device. The MNO provisioning system (MPS) may use information of UE devices for which an SIM has been reserved for downloading. After validation of the UE device, the remote SIM provisioning platform address (e.g., uniform resource locator (URL)) may be pushed to the UE device to trigger automatic download of the SIM profile to the pre-activated UE device. Therefore, implementations described herein may be scalable for bulk activation, for example, for a fleet of user devices. In addition, implementations described herein may allow for a similar user experience to user activation of an insertable SIM card.

Moreover, methods and systems may provide for "zero-touch" power-on activation of the UE device. For example, UE devices may be pre-activated for network service according to implementations described herein, for example, using an original equipment manufacturer (OEM) portal and/or by submitting an order that includes user information and UE device information. Once powered on, the UE device may broadcast certain information to one or more OEMs. Upon authentication by one of the OEMs, the UE device may initiate a SIM over-the-air (OTA) provisioning, which may execute in the background with little to no user interaction. The zero-touch global connectivity reduces system overhead by reducing the need for dedicated servers and customized embedded universal integrated circuit cards (eUICCs).

Figure 1:
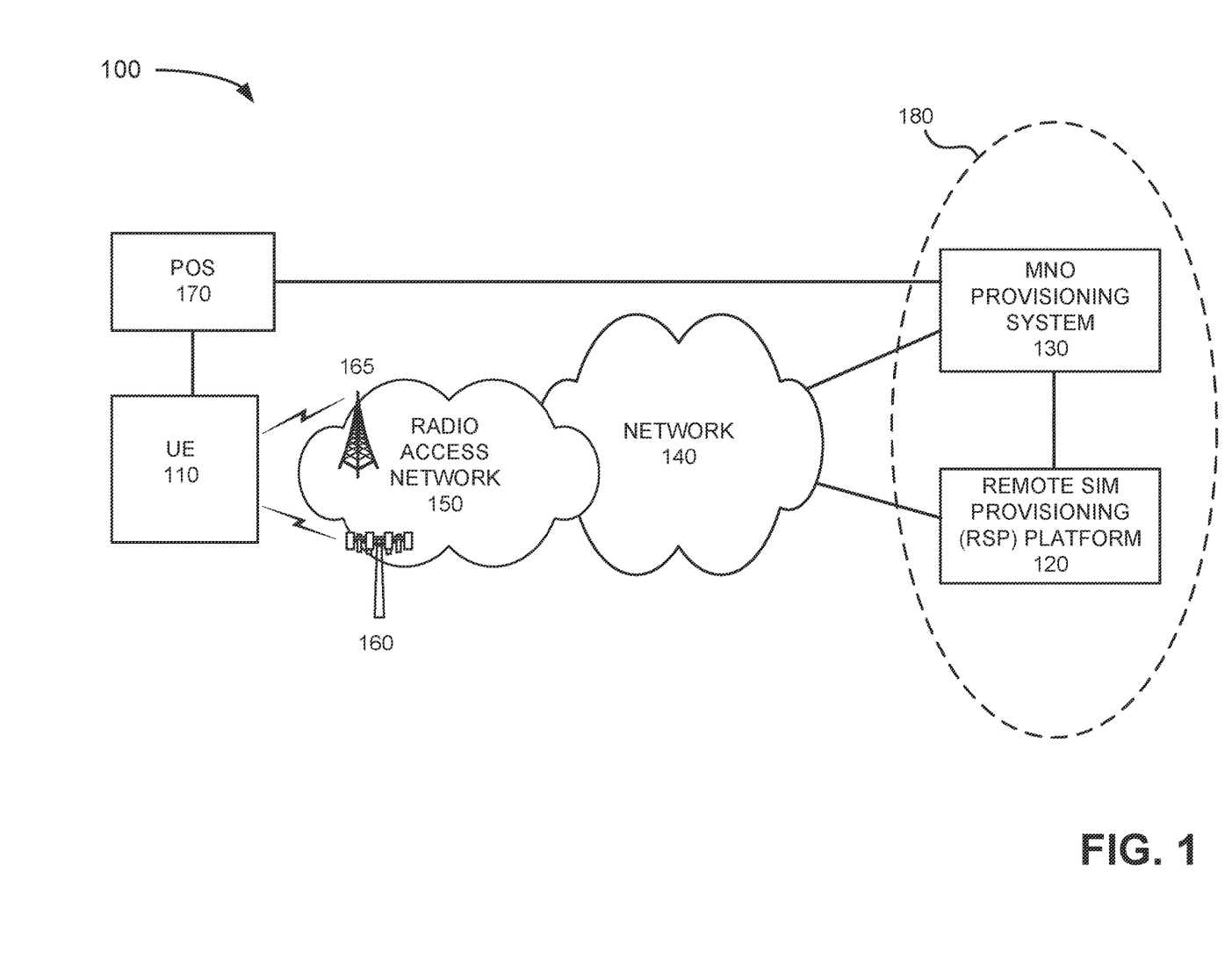
FIG. 1 is a diagram illustrating an exemplary environment in which systems and/or methods, described herein, may be implemented.

FIG. 1 is a diagram of an exemplary environment 100 in which the systems and/or methods, described herein, may be implemented. As shown in FIG. 1, environment 100 may include user equipment (UE) device 110 (or UE 110), a remote SIM provisioning (RSP) platform 120 (or RSP 120), an MNO provisioning system 130, a network 140, a radio access network (RAN) 150, and a point-of-sale (POS) device 170 for business to business (B2B) and/or business-to-consumer (B2C) (e.g., web portal) customers. The elements shown within area 180 (i.e., RSP platform 120 and MNO provisioning system (MPS) 130) may be associated with an MNO that provides wireless services to UE 110. The elements shown within area 180 may also be interconnected via an internal company network, such as a local area network (LAN) or wide area network (WAN), that includes wired, wireless and/or optical connections between the elements illustrated in FIG. 1. In other implementations, the devices illustrated within area 180 may be directly or indirectly coupled to each other via an external network, such as the Internet. In some embodiments, area 180 may include a core network associated with an MNO.

UE 110 may include any device with long-range (e.g., cellular or mobile wireless network) wireless communication functionality. For example, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a small cell device, a smart television, etc.; a portable gaming system; a global positioning system (GPS) device; a home appliance device; a home monitoring device; an Internet of things (IoT) device; a sensor device; and/or any other type of computer device with wireless communication capabilities and a user interface. UE 110 may include capabilities for voice communication, mobile broadband services (e.g., video streaming, real-time gaming, premium Internet access etc.), best effort data traffic, and/or other types of applications. UE 110 may also be referred to herein as a user device, a mobile device, or an SIM-enabled device.

Figure 2A:
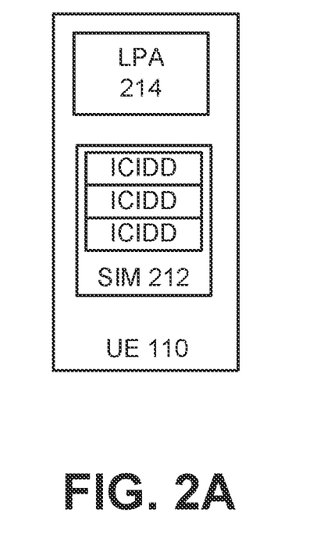
FIGS. 2A-C are diagrams of exemplary functional components of devices that may be included in the environment shown in FIG. 1.

Referring to FIG. 2A, UE 110 may include an SIM 212. SIM 212 may be implemented as an eUICC that allows UE 110 to wirelessly access an MNO communication network. In some embodiments, SIM 212 may include an embedded secure element (SE). SIM 212 may be directly embedded into UE 110. SIM 212 may store Integrated Circuit Card Identifiers (ICCIDs). ICCIDs may also be referred to as SIM profiles or SIM profiles. An ICCID may store MNO and subscriber data, such as a user's subscription credentials, network settings, and/or SIM-based applications, and allow UE 110 and/or the user to connect to the wireless MNO network.

UE 110 may include a local profile assistant (LPA) 214. LPA 214 may include logic associated with interfacing with SIM 212 to activate UE 110. LPA 214 may interface with RSP 120 to activate existing ICCIDs or download and activate a new ICCID or encrypted SIM profile to SIM 212. In some embodiments, LPA 214 may provide a local management end user interface for managing the status of SIM profiles, as further described below.

Figure 2B:
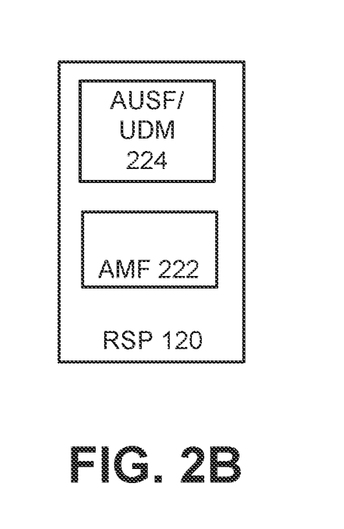

As shown in FIG. 2B, RSP 120 may include one or more computing devices or systems, for example, of a backhaul network, which provide for remote provisioning of ICCIDs to UEs 110. For example, RSP 220 may include billing-related systems/databases, an electronic telephone number inventory (ETNI), a mobile terminating access service (MTAS), etc. RSP 120 may include an Access and Mobility Management Function (AMF) that receives connection and session related information from UE 110 and may be configured to handle connection and mobility management tasks via a New Radio (NR) 5G wireless access network. Alternatively, in a Long Term Evolution (LTE) access network, RSP 120 may include a Mobility Management Entity (MME). RSP 120 may further include an Authentication Server Function (AUSF) that authenticates servers and provides encryption keys and a Unified Data Management (UDM) function 224 that stores and manages data received via the NR 5G RAN. Alternatively, RSP 120 may include a Home Subscriber Server (HSS) that is configured to communicate with the an LTE access network and provide subscriber profile and authentication information, and/or be configured to store information about subscribers to enable authorization, details of devices, as well as the user's location and service information. RSP 120 may act as an interface between MNO provisioning system 130 and LPA 214 of UE 110 to provision an ICCID with a new service or download an ICCID to SIM 212, as further described below.

Figure 2C:
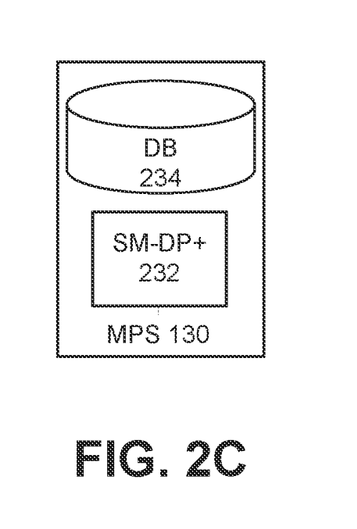

Referring to FIG. 2C, MPS 130 may include one or more computing devices or systems that act as a backend for a wireless network to facilitate operations of the wireless network. RSP 120 may include a subscription manager— data preparation (SM-DP+) device 232 (also referred to as SM-DP+ 232) that operates as an SIM subscription management server associated with a wireless MNO network. For example, SM-DP+ device 232 may be configured for creation, download, remote management (e.g., enable, disable, update, delete), and/or the protection of MNO credentials (e.g., the SIM profile). MNO provisioning system 130 may include a database (DB) 234 that is configured to store records of SIM profiles associated with UEs 110. In one embodiment, MNO provisioning system 130 may include one or more devices that operate as a mobile device management (MDM) server associated with a wireless MNO network. MNO provisioning system 130 may interact with RSP 120 to facilitate activation of UE 110, as further described below.

Referring again to FIG. 1, network 140 may include one or more wired, wireless, and/or optical networks that are capable of receiving and transmitting data, voice, and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a LAN, a WAN, a personal area network (PAN), a WiFi network, a Bluetooth network, an intranet, the Internet, or another type of network that is capable of transmitting data. Network 140 provides wireless packet-switched services and wireless Internet protocol (IP) connectivity to UEs 110 to provide, for example, data, voice, and/or multimedia services.

RAN 150 may provide an air interface to network 140 for wireless devices, such as UE 110. RAN 150 may enable UE 110 to connect to network 140 for mobile telephone service, Short Message Service (SMS) message service, Multimedia Message Service (MMS) message service, Internet access, cloud computing, and/or other types of data services. For example, RAN 150 may establish an Internet Protocol (IP) connection between UE 110 and network 140.

RAN 150 may include a 5G access network or other advanced networks (e.g., 6G, 7G, etc.). In some implementations, RAN 150 may include a Long Term Evolution (LTE) access network and/or an LTE Advanced (LTE-A) access network. In other implementations, RAN 150 may include a Code Division Multiple Access (CDMA) access network. For example, the CDMA access network may include a CDMA enhanced High Rate Packet Data (eHRPD) network (which may provide access to an LTE access network). As described herein, RAN 150 may include a 5G base station 160 (e.g., a next generation Node B (gNB)) and/or a 4G base station 165 (e.g., an evolved Node B (eNB)). 5G base station 160 and/or 4G base station 165 may each include one or multiple cells that include devices and/or components configured to enable radio communication with UE 110.

POS device 170 (also referred to as POS 170) may include an interface for interacting with a user related to ordering or acquiring UE 110. In one implementation, POS 170 may be associated with an MNO, an original equipment manufacturer (OEM), a distributor, an online retailer, a brick and mortar establishment, etc., from which the user obtains UE 110 and/or a subscription to cellular network service for UE 110. In one implementation, POS 170 may provide information such as user data, subscription data, wireless service data, MNO credentials, or other entity to MNO provisioning system 130, for example, for use in configuring an SIM profile for activating UE 110.

As used herein, the term "user" is intended to be broadly interpreted to include UE 110 and/or a person using UE 110. Also, the terms "user," "operator," "consumer," "account holder," "manager," "administrator," "subscriber," and/or "customer" are intended to be used interchangeably. The number of devices and/or networks, illustrated in FIGS. 1 and 2A-C, is provided for explanatory purposes only. In practice, additional devices and/or networks, fewer devices and/or networks, different devices and/or networks, or differently arranged devices and/or networks than those illustrated in FIGS. 1 and 2A-C may be used. Also, in some implementations, one or more of the components or networks may perform one or more functions described as being performed by another one or more of the other components or networks. The components and networks shown in FIGS. 1 and 2A-C may interconnect via wired connections, wireless connections, or a combination of wired and wireless connections.

Figure 3:
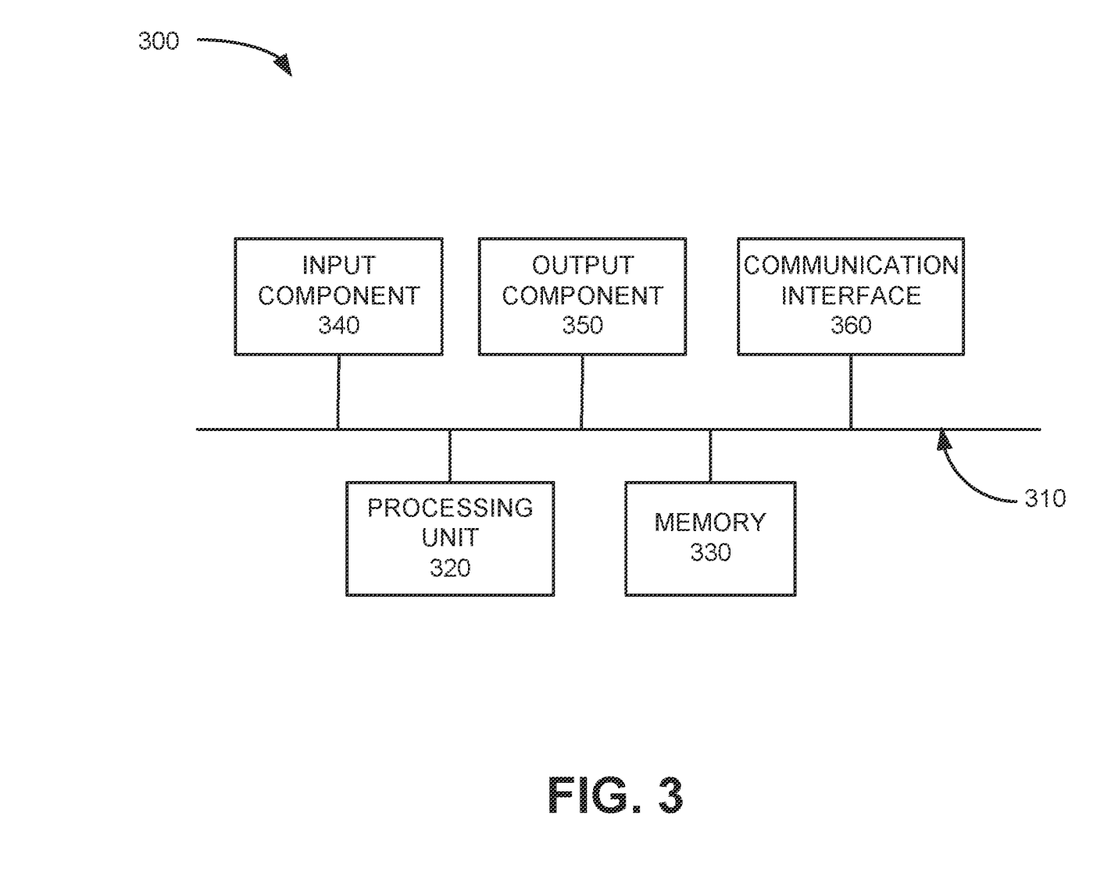
FIG. 3 is a diagram of exemplary components of a device that may be included in the environment shown in FIG. 1.

FIG. 3 is a diagram of exemplary components of a device 300 that may correspond to one of the components of UE 110, LPA 114, RSP 120, MNO provisioning system 130, SM-DP+ 232, DB 234, network 140, RAN 150, 5G base station 160, 4G base station 165, and/or POS 170. As illustrated, device 300 may include a bus 310, a processing unit 320, a memory 330, an input component 340, an output component 350, and a communication interface 360.

Bus 310 may permit communication among the components of device 300. Processing unit 320 may include one or more processors or microprocessors that interpret and execute instructions. Additionally, or alternatively, processing unit 320 may be implemented as or include one or more application specific integrated circuits (ASICs), field programmable gate arrays (FPGAs), or the like. Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input component 340 may include a device that permits an operator to input information to device 300, such as a button, a switch, a keyboard, a keypad, a mouse, a microphone or the like. Output component 350 may include a device that outputs information to the operator, such as a display (e.g., a liquid crystal display), a printer, a speaker, a light emitting diode (LED), etc.

Communication interface 360 may include one or more transceivers that enables device 300 to communicate with other devices and/or systems. For example, communication interface 360 may include one or more radio frequency (RF) receivers, transmitters, and/or transceivers and or more antennas for transmitting and receiving data. Communication interface 360 may also include a modem or Ethernet interface to a LAN or other mechanism for communicating with other devices.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

Figure 4:
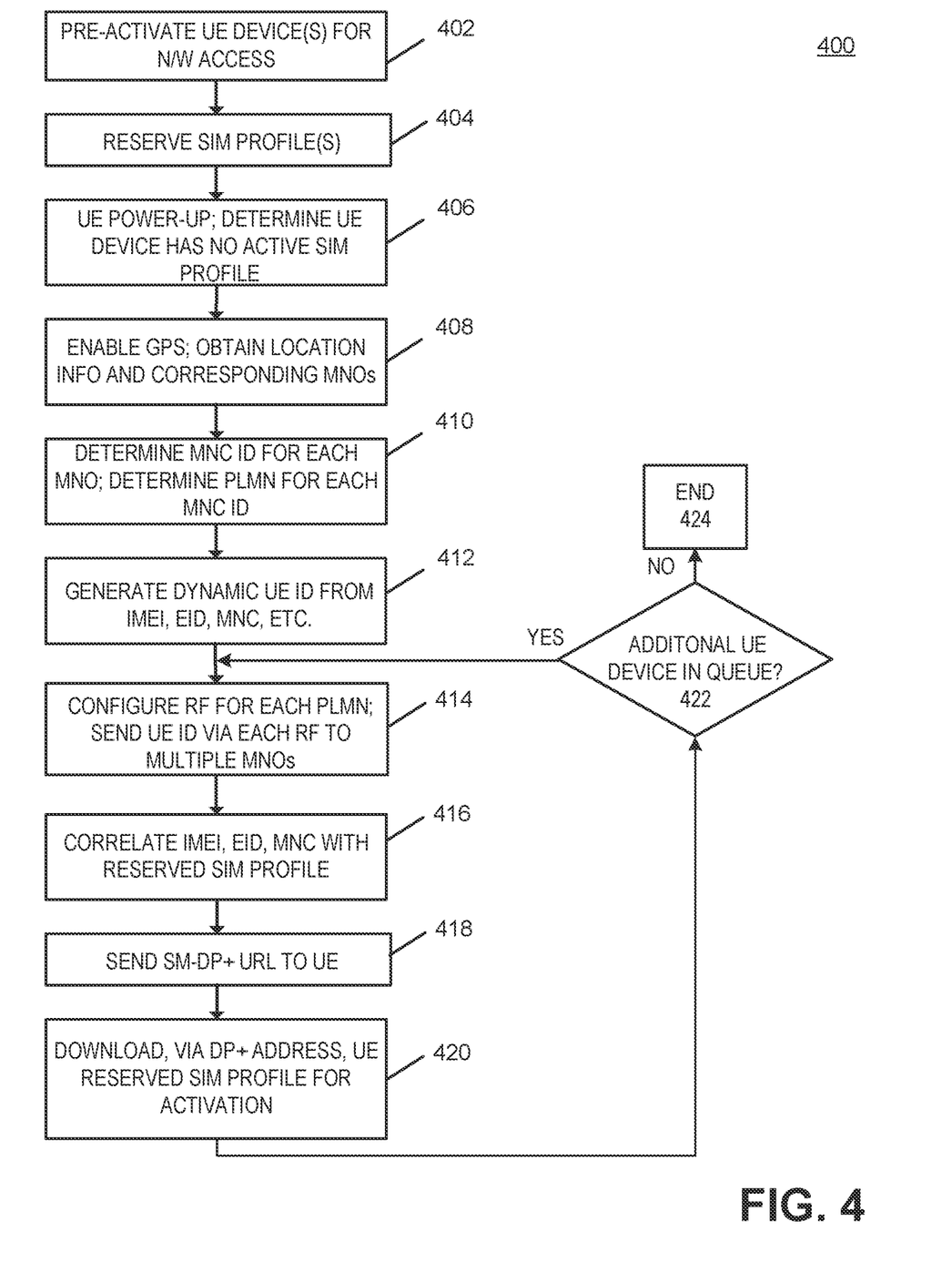
FIG. 4 is a flow chart of an exemplary process in which an SIM profile may be provisioned.

FIG. 4 illustrates an exemplary remote SIM provisioning process 400 for activating an SIM device when no SIM profile is installed and active on UE 110. Method 400 may be performed by components of UE 110, RSP 120, MNO provisioning system 130, and/or other network devices described herein.

Remote SIM provisioning process 400 may begin with a user interacting with POS 170 to order/set up UE device 110 and sign up to access wireless network services with an MNO. In some embodiments, UE 110 may include a fleet of devices associated with an enterprise user, and one or more of the following operations may be performed concurrently for multiple UE devices 110. The user may provide user information to POS 170 which may then be forwarded to MNO provisioning system 130. MNO provisioning system 130 may store the user information (e.g., in DB 234) and use MNO data and/or user information to pre-activate UE device 110, for example, with an activation code (block 402).

MNO provisioning system 130 may use MNO data and/or user information to generate an SIM profile for UE 110. For example, SM-DP+ 232 may store an equipment ID (EID), an International Mobile Equipment Identity (IMEI), a mobile network code (MNC) or another MNO identifier and/or user data on a reserved SIM profile for UE device 110 (block 404). In other embodiments, one or more IDs may be implemented as a Mobile Station International Subscriber Directory Number (MSISDN), an International Mobile Subscriber Identity (IMSI), a Subscription Permanent Identifier (SUPI), an International Mobile Equipment Identity (IMEI), a network address (e.g., a Medium Access Control (MAC) address, an Internet Protocol (IP) address, etc.), an Internet Protocol Multimedia Subsystem Private Identifier (IMPI), a Mobile Equipment Identifier (MEID), or other suitable string (e.g., numeric, alphabetic, alpha-numeric, etc.) or unique identifier. In some embodiments, the SIM profile may be stored in AUSF/UDM function 224 or, in an LTE environment, in an HSS.

Remote SIM provisioning process 400 may include UE 110 being initially powered-up, for example, by the user, and determining that no active SIM profile is available on UE device 110 (block 406). For example, UE device 110 may determine that no ICIDD is active in SIM 212. Based on the determination, UE device 110 may enable global positioning system (GPS) capability to obtain location data for UE 110 and one or more MNOs that service an area associated with the identified location (block 408). UE 110 may also receive location update data from RAN 150. For example, UE device 110 may use the location data in a look-up table to identify one or more MNOs available in area of UE 110. Based on the MNO information, UE device 110 may generate a corresponding MNC ID for each available MNO, and generate a public land mobile network (PLMN) identifier (ID) for each MNC ID (block 410).

In one embodiment, UE 110 may generate a temporary device ID for UE 110 (block 412). For example, UE 110 may multiplex the IMEI, EID, and MNC, or other identifier, to generate a 32-bit random number associated with UE 110. In other embodiments, in which UE 110 is part of a network that connects to a wireless access point, such as a WiFi router, UE 110 may generate a Service Set Identifier (SSID). UE device 110 may use each PLMN ID to configure an RF channel over which to send a discovery message, which includes the temporary device ID, to the one or more MNOs (block 414). For example, each temporary device ID may be sent to corresponding RANs of each MNO associated with the RF channels. For cellular connections, UE device 110 may establish as many RF channels to MNOs at a same time as available bandwidth allows. Alternatively, for wireless access points (e.g., WiFi) of customer premises equipment (CPE), UE device 110 may establish as many RF channels to MNOs at the same time that are supported by the access point (e.g., up to 12 or another number).

Processing may continue with RSP 120 extracting the IMEI, the EID, and the MNC (or other identifier(s)) from the temporary device ID associated with UE 110. For example, the AMF of RSP 120 may perform a demultiplexing sequence to extract the IMEI, the EID, and the MNC (or other identifier(s)) from the temporary device ID. In other embodiments, the HSS of RSP may perform the multiplexing or merging of the identifiers. RSP platform 120 may then attempt to correlate the extracted data to the corresponding information that is stored for a pre-activated UE device 110 (block 416). For example, the UDM function of RSP 120 may compare the extracted data (e.g., the IMEI, the EID, the MNC, etc.) to the stored IMEI, EID, and MNC data in DB 234. In other embodiments, the correlation process may be performed by the HSS of RSP 120.

For one or more of the MNOs, no correlation may be made between the data transmitted by UE 110 and the stored data for pre-activated devices. That is, only one of the MNOs to which the data was transmitted by UE 110 will have matching data that was stored during pre-activation of UE 110 in block 402. Upon a successful match, processing may continue with RSP platform 120, of the one MNO with the matching data of pre-activated UE device 110, forwarding the network address of SM-DP+ 232 to UE 110 block 418). For example, RSP platform 120 may send a uniform resource locator (URL) for SM-DP+ 232 to UE 110.

Processing may continue with receipt of the URL and/or FQDN for SM-DP+ 232 triggering UE device 110 to download the SIM profile from SM-DP+ 232 reserved for UE 110 (block 420). For example, when UE device 110 camps on the RF channel for the URL (or FQDN), the SIM profile may be pushed to UE device 110 via the RF channel. The SIM profile may be stored (e.g., as an ICIDD) in SIM 212 of UE 110 and set-up and/or decryption functions performed by LPA 214 to provision SIM 212. UE 110 may then initiate an authentication process with the MNO, and upon successful authentication, may wirelessly access the MNO network using SIM 212.

Processing may continue with determining whether any more UE devices 110 are in a queue for remote SIM provisioning (block 422). That is, other UE devices 110 may have performed any of the steps of remote SIM provisioning process 400 described above while awaiting allocation of an RF channel over which to communicate with the MNOs in order to activate UE device 110 (block 422—YES). Once RF bandwidth or an RF channel becomes available, the device(s) in the queue may send its temporary UE ID to the available MNOs per block 414. If no more UE devices 110 are in the queue (block 422—NO), processing may end (block 424).

Figure 5:
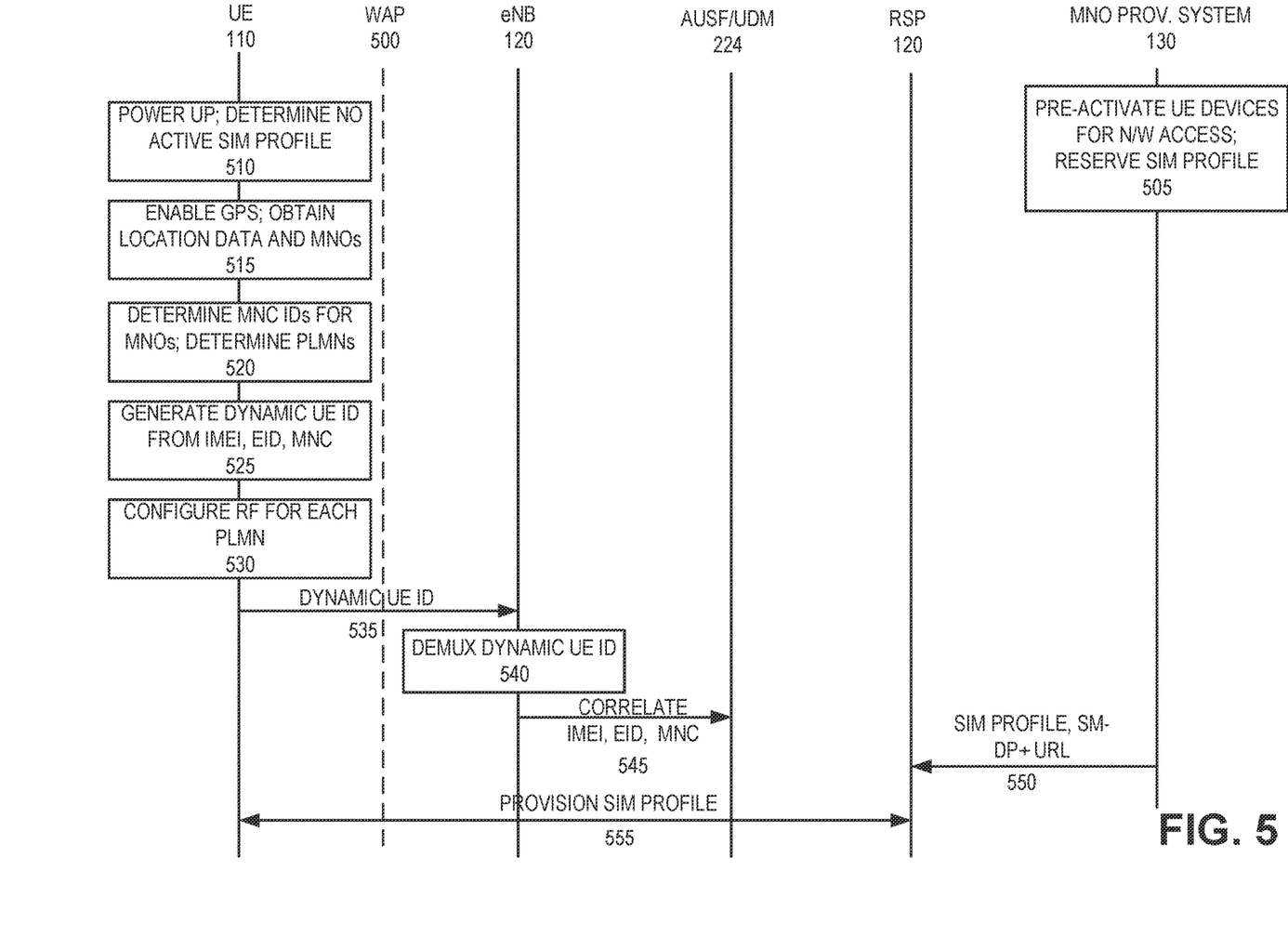
FIG. 5 is a diagram illustrating exemplary operations and messaging between devices to provision UEs with SIM profiles.

FIG. 5 is a diagram illustrating exemplary messaging and operations between devices in network environment 100. Communications in FIG. 5 represent communications for provisioning an SIM profile.

Referring to FIG. 5, when a user interacts with POS 170 to sign up for services for any number of UE devices 110, information such as user data, activation codes, and the like, may be forwarded to and stored by MNO provisioning system 130. MNO provisioning system 130 may use MNO data and/or the user information to pre-activate UE device 110 and/or reserve an SIM profile for UE 110 (505). For example, SM-DP+ 232 may store an EID, an IMEI, an MNC or other MNO identifier and/or user data on a reserved SIM profile for UE device 110.

Upon initial power-up UE 110 may determine that no active SIM profile is available on UE device 110 (510). For example, UE device 110 may determine that no ICIDD is active in SIM 212. Based on the determination, UE device 110 may enable GPS or other location-aware mechanisms to obtain location data for UE 110 and one or more MNOs that service an area associated with the identified location (515). For example, UE device 110 may use the location data in a look-up table to identify one or more MNOs available in the area of UE 110. Based on the MNO information, UE device 110 may generate a corresponding MNC ID for each available MNO, and generate a public land mobile network (PLMN) identifier (ID) for each MNC ID (520).

In one embodiment, UE 110 may generate a temporary device ID for UE 110 by multiplexing the IMEI, EID, and MNC, or other identifier, to generate a 32-bit random number associated with UE 110 (525). In other embodiments, in which UE 110 is part of a network that connects via a wireless access point 500, UE 110 may generate an SSID. UE device 110 may use each PLMN ID to configure an RF channel (530) over which to send a discovery message 535, that includes the temporary device ID, to the one or more MNOs. For example, each temporary device ID may be sent to corresponding RANs of each MNO associated with the RF channels. For all MNOs other than the MNO storing the reserved SIM profile, no response may be received by UE 110 and no further action taken by the MNO. That is, one or more RANs may determine that UE 110 is not configured to access the MNO's network services.

In some embodiments, without assignment of the SUPI and/or the MSISDN to UE 110, which is in a pre-activated state, and prior to the SIM profile being downloaded from the MNO, UE 110 may generate a temporary ID that uniquely identifies UE 110 to the associated MNO. Changes to RAN 150 may be rendered unnecessary because a temporary UE ID (discussed above) may be used as an alternative to the SUPI and/or the MSISDN and the network provisioning system (e.g., elements of or connected to RAN 150 and HSS/UDM 224) may provide the necessary correlation in order to identify UE 110 requesting downloading of the SIM profile.

RSP 120 of the provisioning MNO may extract the IMEI, the EID, and the MNC from the temporary device ID associated with UE 110 by demultiplexing the temporary UE ID to extract the IMEI, the EID, and the MNC from the temporary device ID (540). RSP platform 120 may then correlate the extracted data to the corresponding information that is stored for a pre-activated UE device 110 (545). For example, the UDM function of RSP 120 may compare the extracted data (e.g., the IMEI, the EID, the MNC, etc.) to the stored IMEI, EID, and MNC data in DB 234. Based upon a successful correlation, MNO provisioning system 130 may forward 550 the reserved SIM profile to RSP platform 120 with a URL for SM-DP+ 232.

The URL (or FQDN) for SM-DP+ 232 may be sent to UE 110 and trigger UE device 110 to download 555 the SIM profile from SM-DP+ 232 reserved for UE 110. For example, when UE device 110 camps on the RF channel for the URL, the SIM profile may be pushed to UE device 110 via the RF channel. The SIM profile may be stored (e.g., as an ICIDD) in SIM 212 of UE 110 and set-up and/or decryption functions performed by LPA 214 to provision SIM 212. UE 110 may then initiate an authentication process with the MNO, and upon successful authentication, may wirelessly access the MNO network using SIM 212.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 4, and a series of signal flows/messages have been described with respect to FIG. 5, the order of the blocks and/or signal flows may be modified in other implementations. Further, non-dependent blocks may be performed in parallel. In addition, As used here, SIM may include a physical SIM and/or an eSIM.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by a user device, that the user device does not include a subscriber identity module (SIM) profile activated to provision a wireless service of a first mobile network operator (MNO);
   obtaining, by the user device, location data for the user device;
   generating, by the user device, multiple mobile network codes (MNCs) and corresponding public land mobile network (PLMN) identifiers (IDs) for multiple MNOs that service an area associated with the location data, wherein the multiple MNOs include the first MNO;
   configuring, by the user device and using the PLMN IDs, a radio frequency (RF) channel associated with each of the MNOs using each PLMN ID;
   generating, by the user device, temporary device IDs for the user device, wherein the temporary device IDs include the MNCs and at least one of an equipment ID (EID) or an International Mobile Equipment Identity (IMEI), and wherein generating the temporary device IDs comprises multiplexing a random key;
   demultiplexing a discovery message to extract the MNCs and the at least one of the EID or the IMEI;
   transmitting, by the user device, the discovery message including each device ID via the RF channel associated with each MNO;
   receiving, by the user device, from the first MNO storing a reserved SIM profile for the device ID, a network address; and
   downloading, by the user device, the reserved SIM profile via the network address.

2. The method of claim 1, wherein the temporary device IDs include the EID and the IMEI.

3. The method of claim 1, wherein the temporary device IDs further comprise a Subscription Permanent Identifier.

4. The method of claim 1, wherein the temporary device IDs further comprise an International Mobile Subscriber Identity (IMSI).

5. The method of claim 1, further comprising:
   storing the reserved SIM profile for a set of user devices including the user device; and automatically provisioning the wireless service to each user device of the set upon initial powering up of each user device of the set.

6. The method of claim 1, further comprising:
allocating a set of user devices that include the user device; and
storing the reserved SIM profile responsive to the allocation.

7. The method of claim 1, further comprising:
activating the wireless service using the reserved SIM profile.

8. A system comprising:
processors configured to:
determine that the user device does not include a subscriber identity module (SIM) profile activated to provision a wireless service of a first mobile network operator (MNO);
obtain location data for the user device;
generate multiple mobile network codes (MNCs) and corresponding public land mobile network (PLMN) identifiers (IDs) for multiple MNOs that service an area associated with the location data, wherein the multiple MNOs include the first MNO;
configure, using the PLMN IDs, a radio frequency (RF) channel associated with each of the MNOs using each PLMN ID;
generate temporary device IDs for the user device, wherein the temporary device IDs include the MNCs and at least one of an equipment ID (EID) or an International Mobile Equipment Identity (IMEI), and wherein generating the temporary device IDs comprises multiplexing a random key;
demultiplex a discovery message to extract the MNCs and the at least one of the EID or the IMEI;
transmit the discovery message including each device ID via the RF channel associated with each MNO;
receive from the first MNO storing a reserved SIM profile for the device ID, a network address; and
download the reserved SIM profile via the network address.

9. The system of claim 8, wherein the temporary device IDs include the EID and the IMEI.

10. The system of claim 8, wherein the temporary device IDs further comprise a Subscription Permanent Identifier.

11. The system of claim 8, wherein the temporary device IDs further comprise an International Mobile Subscriber Identity (IMSI).

12. The system of claim 8, wherein the one or more processors are further configured to:
store the reserved SIM profile for a set of user devices including the user device; and
automatically provision the wireless service to each user device of the set upon initial powering up of each user device of the set.

13. The system of claim 12, wherein the one or more processors are further configured to:
allocate a set of user devices that include the user device; and
store the reserved SIM profile responsive to the allocation.

14. The system of claim 8, wherein the one or more processors are further configured to:
activate the wireless service using the reserved SIM profile.

15. A non-transitory computer-readable medium storing instructions executable by one or more processors, the instructions comprising:
one or instructions that, when executed by a processor, cause the processor to:
determine that the user device does not include a subscriber identity module (SIM) profile activated to provision a wireless service of a first mobile network operator (MNO);
obtain location data for the user device;
generate multiple mobile network codes (MNCs) and corresponding public land mobile network (PLMN) identifiers (IDs) for multiple MNOs that service an area associated with the location data, wherein the multiple MNOs include the first MNO;
configure, using the PLMN IDs, a radio frequency (RF) channel associated with each of the MNOs using each PLMN ID;
generate temporary device IDs for the user device, wherein the temporary device IDs include the MNCs and at least one of an equipment ID (EID) or an International Mobile Equipment Identity (IMEI), and wherein generating the temporary device IDs comprises multiplexing a random key;
demultiplex a discovery message to extract the MNCs and the at least one of the EID or the IMEI;
transmit the discovery message including each device ID via the RF channel associated with each MNO;
receive from the first MNO storing a reserved SIM profile for the device ID, a network address; and
download the reserved SIM profile via the network address.

16. The non-transitory computer-readable medium of claim 15, wherein the temporary device IDs further include the EID and the IMEI.

17. The non-transitory computer-readable medium of claim 15, wherein the temporary device IDs further comprise a Subscription Permanent Identifier.

18. The non-transitory computer-readable medium of claim 15, wherein the temporary device IDs further comprise an International Mobile Subscriber Identity (IMSI).

19. The non-transitory computer-readable medium of claim 15, wherein the instructions further comprise one or more instructions that cause the one or more processors to:
store the reserved SIM profile for a set of user devices including the user device; and
automatically provision the wireless service to each user device of the set upon initial powering up of each user device of the set.

20. The non-transitory computer-readable medium of claim 15, wherein the one or more instructions that cause the processor to activate the device comprise one or more instructions that cause the one or more processors to:
activate the wireless service using the reserved SIM profile.

* * * * *